(Model.) 2 Sheets—Sheet 2.

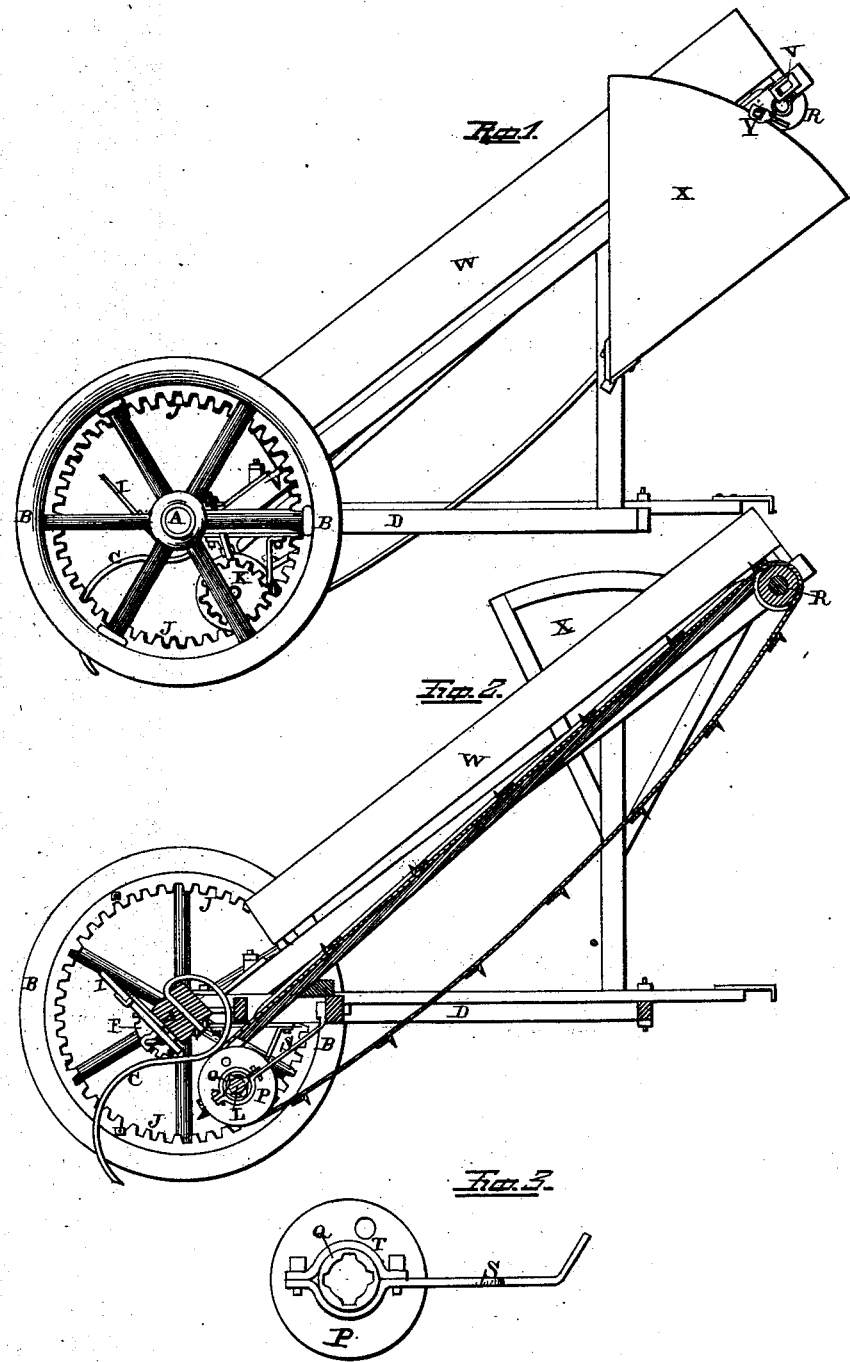

D. SNYDER.
Hay Rake and Loader.

No. 235,467. Patented Dec. 14, 1880.

Witnesses=
H. H. Mortimer.
Chas. H. Isham.

Inventor=
Daniel Snyder,
per
F. A. Lehmann,
Atty

UNITED STATES PATENT OFFICE.

DANIEL SNYDER, OF CLYDE, IOWA.

HAY RAKE AND LOADER.

SPECIFICATION forming part of Letters Patent No. 235,467, dated December 14, 1880.

Application filed April 30, 1880. (Model.)

*To all whom it may concern:*

Be it known that I, DANIEL SNYDER, of Clyde, in the county of Jasper and State of Iowa, have invented certain new and useful Improvements in Combined Hay Rakes and Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes and loaders; and it consists in making the elevator-frame wider at the bottom than the top, and so adjusting the lower pulleys of the endless belts upon the driving-shaft that they will have a slight play or automatic adjustment, so as to run in a line with the pulleys at the upper end of the elevator-frame.

It further consists in a lever which is pivoted upon the axle, and which has a locking-rod attached to it on each side of its pivot, so that the rods will move in opposite directions when the lever is operated, and thus the rods are made to lock the axle in position, so that the rake-teeth cannot be moved after they have once been adjusted in position.

It further consists in the arrangement and combination of parts, which will be more fully described hereinafter, whereby a machine is produced which will rake the hay from the ground and elevate it upon a wagon.

Figure 4:
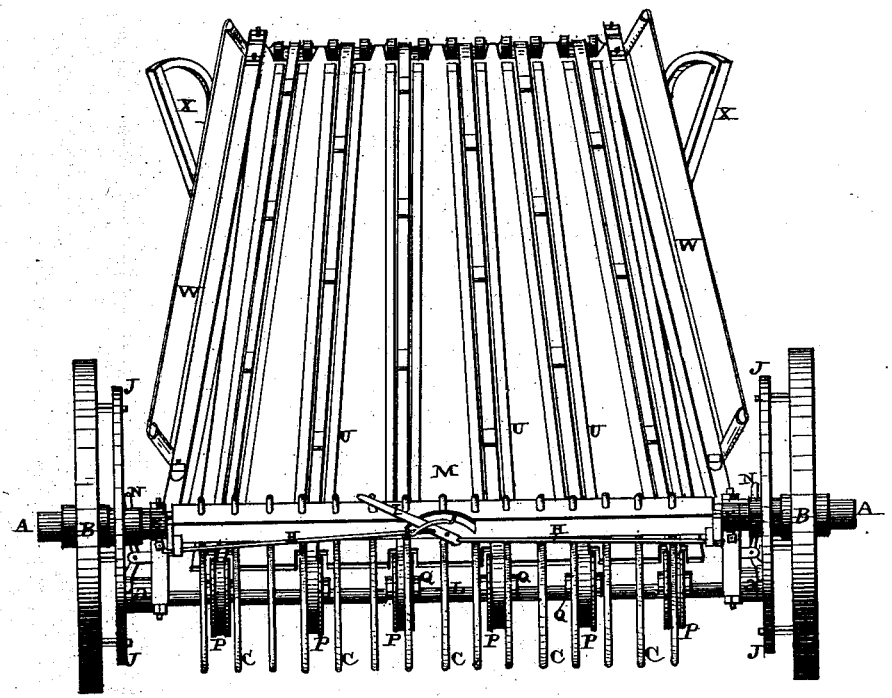
Figure 6:
Figure 5:

Figure 1 is a side elevation of my invention complete. Fig. 2 is a vertical section of the same. Fig. 3 is a detail view. Fig. 4 is an end view taken from the rear. Fig. 5 is a transverse section view of the elevator-bed alone. Fig. 6 is also a detail view of the shaft.

A represents the axle, which is supported at each end by the driving-wheel B. To this axle the rake-teeth C are secured, either in the manner here shown or in any other that may be preferred, and in order to raise and lower the rear points of the teeth this axle is made to revolve freely in its bearings, formed in the hubs of the wheels B.

A short distance inside of each one of the wheels B the spindle is reduced in size, and passed from the horizontal beams D around the spindle at these reduced portions are the bands or straps E, which serve to connect the axle with the elevator-frame. These bands also form bearings for the axle as it is being turned for the purpose of adjusting the rake-teeth. Formed on the rear inner edges of these straps are the notched segments F, into which the locking-bolts H catch for the purpose of locking the axle rigidly in the desired position. These two locking-rods have their inner ends secured to the operating-lever I, upon opposite sides of its pivot, so that when the lever is moved either to the right or left these two locking-rods will be made to move in opposite directions. When the outer ends of these two rods are made to catch in the upper notch in these two segments the teeth are held above the ground, so as not to be brought into play; but when the rods are made to lock in any one of the other notches in the segments the lower ends of the rake-teeth will be brought in contact with the ground. By thus securing the teeth directly to the axle all need of special appliances or rods for the purpose of securing these teeth is entirely done away with and the cost of the elevator correspondingly cheapened.

Secured to the inner side of each one of the driving-wheels B is an internal-toothed driving-wheel, J, which operates a pinion, K, placed loosely upon the end of the shaft L. Each one of these pinions is provided with a ratchet, a, on its inner side, so that it can be thrown in and out of gear, by means of the lever N, with the ratchet, which is secured rigidly to each end of the shaft. By thus providing these pinions with ratchets either one or both of the pinions can be thrown out of gear whenever desired, so as to prevent the elevating-belts from being operated. Another use for these ratchets is to prevent the shaft being driven backward when the machine is being backed or turned around. This driving-shaft L extends entirely across the lower end of the elevator-frame M, which frame is much wider at its lower than at its upper end. A suitable distance apart upon this shaft are formed suitable projections or enlargements, O, of the shape shown in Fig. 6, and over which enlargements are passed the driving-pulleys P. These driving-pulleys have a flange, Q, projecting out from each side for a suitable distance, and which flanges serve as a means of holding the pulley in position upon the shaft. The hole through each pulley is made grooved, as shown, so as to correspond to the shape of the projections on the shaft, and thus, while they revolve freely with the shaft, they can angle sufficiently to revolve in a line with the pulleys R at the upper end of the elevator-bed, and which pulleys R are placed much nearer together than the ones P.

Secured to a cross-beam under the lower end of the elevator-bed is an arm, S, for each one of the pulleys P, and which arms have their rear ends bifurcated and curved, so as to extend upon each side of one of the pulleys P and form the lower bearing for the flanges Q.

Over the upper part of each flange is passed a strap, T, which holds the pulley securely in place upon the rear ends of the supporting-arms. As the front end of each arm is secured rigidly in place, each one of these pulleys will be held in proper position upon the shaft, and while the pulley is at liberty to angle slightly in one direction, it cannot move lengthwise upon the shaft. The elevator-bed is thus made wide at the bottom and narrow at its top, so as to cover a full swath as it is being drawn along, and at the same time force the hay sufficiently near together at its top to be fed readily upon the hay rack or wagon upon which the hay is to be piled. Instead of having all of the belts connected together by the cross-bars, each one is here left entirely separate, and is provided with a series of teeth for carrying the hay upward.

In order to keep the belts straight and prevent them from becoming entangled or stopped up by substances getting under them, each one is provided with a channel, guide, or groove, U, which is formed in or upon the top of the bed, as shown in Fig. 5.

If so preferred, the space between the pulleys P may be covered over in any suitable manner, so as to prevent the hay, while being raised upward from the teeth, from catching either on the shaft or the ends of the arms which hold the pulleys in position.

In order to prevent the hay from being blown away as it is being raised upward on the elevator-bed, there are provided a suitable number of loops or eyes, V, on each side of the elevator, and in these loops are placed suitable standards or rods, to which the canvas aprons W are secured. These aprons W extend along the frame from near the lower end up to the upper one, and prevent the hay from being blown away.

To still further protect the hay, and especially on the upper end of the elevator-bed, on each side of the frame, there is pivoted a triangular shield, X, which is held in place at its front end by means of a suitable cam, Y. By means of this cam this triangular shield can be adjusted to any position at the will of the operator.

Having thus described my invention, I claim—

1. The combination of the axle A, which turns freely in the wheels B and has the rake-teeth C secured to it, the segments F, bands E, horizontal beams D, the locking-rods H, and lever I, the bands E serving to connect the elevating-frame with the axle and as a support for the segments, substantially as shown.

2. In a hay rake and elevator, the combination of the shaft, provided with projections O, with the pulleys P, having grooved openings through their centers, so as to allow the pulleys to angle from one side to the other, substantially as set forth.

3. The combination of the elevator-frame, having the eyes or loops V secured to its sides, with the apron W, which extends along the sides of the elevator-frame, for the purpose of preventing the hay from being blown away, substantially as specified.

4. The combination of the pulleys P, having a flange, Q, projecting out beyond each side, with the supporting-arm for holding the pulley in position upon the shaft, substantially as set forth.

In testimony that I claim the foregoing I have hereunto set my hand this 12th day of April, 1880.

DANIEL SNYDER.

Witnesses:
 WM. H. BAIR,
 D. T. BAIR.